J. G. A. GOEDHART.
LOCK NUT.
APPLICATION FILED DEC. 10, 1918.

1,315,934.   Patented Sept. 9, 1919.

Inventor
Jan Gerard Anton Goedhart
By Munn & Co.
Attorney

UNITED STATES PATENT OFFICE.

JAN GERARD ANTON GOEDHART, OF AMSTERDAM, NETHERLANDS, ASSIGNOR TO NAAMLOOZE VENNOOTSCHAP "PINLOCK" MATTSCHAPPIJ TOT EXPLOITATIE VAN-DEVEILIGHEIDSMOER VOLGENS DE BUITEN-EUROPEESCHE PATENTEN "SYSTEEM VAN DER VALK EN VAN ECK," OF THE HAGUE, NETHERLANDS, A LIMITED-LIABILITY COMPANY OF THE NETHERLANDS.

LOCK-NUT.

1,315,934.   Specification of Letters Patent.   Patented Sept. 9, 1919.

Application filed December 10, 1918. Serial No. 266,071.

*To all whom it may concern:*

Be it known that I, JAN GERARD ANTON GOEDHART, retired naval officer, subject of the Queen of the Netherlands, residing at Amsterdam, in the Province of North Holland, in the Kingdom of the Netherlands, have invented certain new and useful Improvements in Lock-Nuts, of which the following is a specification.

Different lock nuts are known; one of these lock nuts shows at its end face an eccentric projecting lug, and a locking key is used provided with peripheral threads, spaced so far from one another as the pitch of the threads in the nut amounts to, so that when the locking key is inserted between said lug and the bolt, the key following the threads in the nut is jammed and prevents the nut from unscrewing.

This known construction has the drawback that the end face of the nut carrying the lug is a flat surface standing at right angles to the axis of the nut. The locking key follows the threads of the nut when it is inserted, and in consequence thereof in many cases strikes with its lower end said flat surface, before the jamming or clenching has reached a sufficient degree. The nut is then not firmly locked.

According to the invention the end face of the nut between the nuthole and the lug is curved according to a screw line, the pitch of said screw line being the same or larger than the pitch of the threads in the nut, and running in the same direction as said nut threads. This construction has the advantage that when inserting the locking key there will always be a free space between the end face of the nut and the lower end of the locking key, so that under all circumstances the nut will be firmly locked.

The accompanying drawings illustrate the invention and its application. In these:

Figure 1:
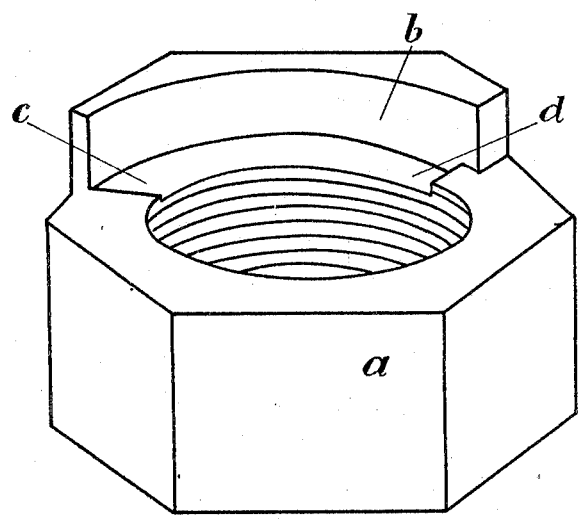
Figure 1 is a perspective view of the nut.

In Fig. 1, $a$ is the nut, $b$ the projecting lug, and $c$ $d$ the end face of the nut, curved according to a screw line.

Figure 2:
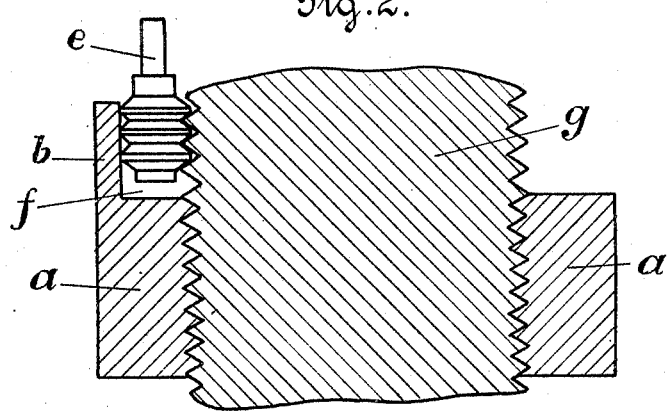
Fig. 2 is a longitudinal section through the nut with bolt and locking key.

In Fig. 2 $a$ is the nut, $b$ the projecting lug, $e$ the locking key, $f$ the necessary space between the lower end of the locking nut and the end face of the nut, and $g$ is the screw bolt.

What I claim is:

Improvements in lock nuts of the kind in which the nut is provided at its end face with an eccentric projecting lug, and the locking key is provided with peripheral threads, spaced so far from one another as the pitch of the threads of the nut amounts to, characterized by the end face of the nut between the lug and the nuthole being curved according to a screw line of pitch not less than the pitch of the threads of the nut, thus leaving a space between the lower end of the inserted locking key and said end face.

In testimony whereof I have hereunto set my hand.

JAN GERARD ANTON GOEDHART.

Copies of this patent may be obtained for five cents each, by addressing the "Commissioner of Patents, Washington, D. C."